United States Patent [19]

Smith et al.

[11] 4,413,935

[45] Nov. 8, 1983

[54] FLOW SPLITTER FOR DIVIDING A STREAM OF PULVERULENT MATERIAL INTO MULTIPLE STREAMS

[75] Inventors: Donald A. Smith, Haddam; Gary F. Lexa, Rocky Hill, both of Conn.

[73] Assignee: Combustion Engineering, Inc., Windsor, Conn.

[21] Appl. No.: 278,242

[22] Filed: Jun. 29, 1981

[51] Int. Cl.³ .............................................. B65G 53/56
[52] U.S. Cl. .................................... 406/181; 251/324; 406/155
[58] Field of Search ................. 406/61, 181, 183, 193, 406/92; 251/324; 137/883

[56] References Cited

U.S. PATENT DOCUMENTS

| Re. 24,716 | 10/1959 | Anselman et al. | 406/92 X |
| 1,871,853 | 8/1932 | Kennedy | 406/155 X |
| 2,084,397 | 6/1937 | Hildebrandt | 251/324 X |
| 3,255,938 | 6/1966 | Dimmich et al. | 251/324 X |
| 3,386,474 | 6/1968 | Kimmel | 137/883 |
| 3,508,577 | 4/1970 | Vincent et al. | 251/324 |

Primary Examiner—John J. Love
Assistant Examiner—L. E. Williams
Attorney, Agent, or Firm—William W. Habelt

[57] ABSTRACT

A flow splitter for dividing a single stream of pulverulent material entrained in air into a multiplicity of substantially equal substreams for delivery to a multiplicity of receiving stations.

7 Claims, 2 Drawing Figures

4,413,935

FLOW SPLITTER FOR DIVIDING A STREAM OF PULVERULENT MATERIAL INTO MULTIPLE STREAMS

BACKGROUND OF THE INVENTION

The present invention relates to an apparatus for splitting a stream of pulverulent material into a multiplicity of equal streams for pneumatically transporting from a single source to multiple receiving stations.

Flow splitters for dividing a stream of pulverulent material such as pulverized coal entrained in air into a multiplicity of streams are not unknown in the art. A common type of such a device utilizes a conical body disposed in the flow path of the single stream to perfect the division of the stream into a multiplicity of streams. A typical embodiment of such a flow splitter, as disclosed in U.S. Pat. No. 1,769,763, comprises a generally elongated, up-right distributor housing having an inlet in the top and a multiplicity of outlets disposed around its bottom periphery. A conical body is disposed within the housing with the base of the cone at the outlet end of the housing and the apex of the cone pointed upward toward the top of the housing. The conical body may be stationary or it may be rotatable as disclosed in U.S. Pat. No. 1,871,853.

In operation, the pulverulent material is mixed with a transport medium, most commonly air, and passed into the flow splitter in a whirling pattern under pressure supplied by a fan or a compressor. As the stream passes through the distributor housing of the splitter, it diverges outwardly in a swirling pattern over the surface of the conical body and through the various outlets disposed around the face of the conical body into the individual transport lines connected to the opposite end of the distributor housing.

A problem typically encountered with such flow splitters as described above occurs when flow through one or more of the transport lines being fed by the distributor is shut off. Typically a damper or a valve disposed in the transport downstream of the flow splitter is closed in order to shut off flow to the transport line. When the damper or valve is closed pulverulent material can collect and become packed in the transport line between the closed damper or valve and the outlet of the flow splitter to which the line is connected. This blockage of material can cause problems in bringing a transport line back into service as the pulverulent material can become packed to a very high density and act as a block to flow.

Additionally, significant turbulence is generated within the distributor housing in the vicinity of the outlet which opens into the closed line because of surface irregularities presented at the outlets opening in the periphial wall or floor of the distributor housing. As a consequence to this turbulence, the swirling flow pattern within the housing is disturbed and uniform distribution of the pulverulent material amongst the transport lines remaining open is destroyed.

It is therefore an object of the present invention to provide an improved apparatus for splitting a stream of pulverulent material into a multiplicity of streams wherein the packing of transport lines and the disturbance of uniform distribution do not occur when one or more of the transport lines connected to the flow splitter is shut off.

SUMMARY OF THE INVENTION

A flow splitter for dividing a single stream of pulverulent material entrained in air to a multiplicity of substantially equal substreams for delivery to a multiplicity of receiving stations. The flow splitter comprises an elongated open-ended convergent nozzle for receiving a stream of pulverulent material entrained in air from a supply source, a distributor housing defining a substantially cylindrical distribution chamber having inlet mated to the outlet of the convergent nozzle and a plurality of outlet openings equally spaced about the periphery of an opening from the opposite end thereof, a splitter plug having a conical tip coaxially disposed within the distribution chamber with the tip of the cone facing the inlet to the distribution chamber and the base of the conical tip lying adjacent the outlet opening of the chamber, and a plurality of outlet valve assemblies equal in number to the number of outlet openings.

Each outlet valve defines a flow conduit having an inlet mated to an outlet opening in the distribution chamber and an outlet connected to a transport pipe through which the substream of pulverulent material leaving the flow splitter therethrough is directed to a receiving station.

In accordance with the present invention, there is disposed within the flow conduit of each valve assembly, a valve member which is slidably movable and selectively positionable therein at locations from the inlet to the flow conduit from the distribution chamber to a point downstream of the outlet of the flow conduit. The end face of each valve member is contoured to conform with the inner surface of the cylindrical distribution chamber to which the valve assembly mates so that when the flow conduit is closed off by positioning the valve member at the inlet thereto, the end face of the valve member mates with the inner surface of the cylindrical distribution chamber so as to present a smooth surface to the flow of pulverulent material within a distribution chamber and thereby not generate turbulence which would disturb the uniform distribution of pulverulent material through the remaining open outlet openings in the distribution chamber.

DESCRIPTION OF A PREFERRED EMBODIMENT

Figure 1:
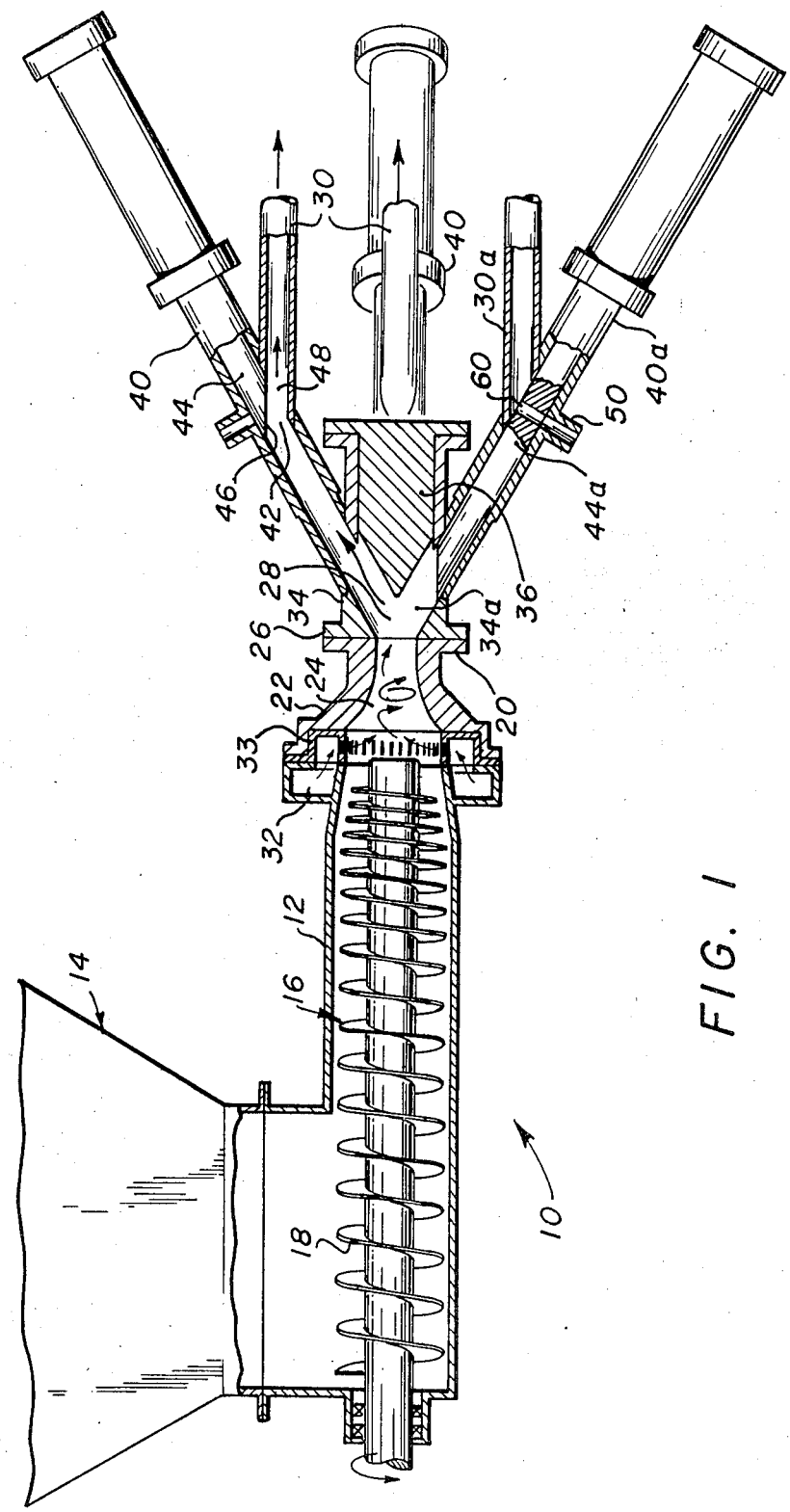
FIG. 1 is a sectional side elevational view showing a pulverulent material distribution system employing a horizontally disposed flow splitter designed in accordance with the present invention.

Referring to the drawing, there is illustrated therein a pulverulent material distribution apparatus, generally designated by reference numeral 10, employing the flow splitter 20 of the present invention. The pulverulent material distribution apparatus 10 is operative to pneumatically transport pulverulent material from a single source, such as a storage bin, to multiple receiving stations and to equally distribute the pulverulent material amongst the receiving stations.

As shown in the accompanying figures, the pulverulent material distribution apparatus 10 is comprised of a solids pump 12, a flow splitter 20, illustrated in the drawing as providing a four way split, and the transport lines 30 which interconnect the flow splitter to the various receiving stations. The solids pump 12 is arranged to receive a pulverulent material from a source such as storage bin 14. A rotary feed screw 16 is concentrically and rotatably mounted within the solids pump 12. A drive motor, not shown, rotates the screw at a high speed typically on the order of 1250 rpm. Pulverulent material from the storage bin 14 passes into the pump 12 and is engaged in the flights 18 of the screw 16. As a screw 16 rotates, the pulverulent material engaged by the helical flights 18 of the screw passes along the length of the screw to the outlet end of the pump 12 and discharges therefrom into the flow splitter 20, which is comprised of an inlet nozzle 22 defining a receiving-/mixing chamber 24, a distributor housing 26 defining a distribution chamber 28 and a plurality of outlet valve assemblies 40.

Disposed about the outlet end of the solids pump 12 is an air header 32 for supplying air under pressure as the transport medium for the pulverulent material. The pulverulent material discharging from the pump 12 and the high pressure air supplied from air header 32 pass into the mixing chamber 24 of the inlet nozzle 22. The mixing of the air with the pulverulent material, which is simply fed axially into the mixing chamber 24 from the feed pump 12, may be promoted by swirling the air flow as it enters the mixing chamber from the supply header 32. Preferably, there is disposed at the inlet to the mixing chamber 24 means 33 for swirling the air flow as it enters the mixing chamber. The resultant vortex formed in the mixing chamber improved the intermixing of the air with the pulverulent material and aids in insuring that a substantially uniform mixture of pulverulent material and air exists at the outlet of the mixing chamber 24.

To further improve the intermixing of the pulverulent material with the transport air, the mixing chamber 24 of the inlet nozzle 22 is preferably in the form of an elongated open ended chamber converging from a maximum diameter at its inlet end to a minimum diameter at its outlet end as shown in FIG. 1. The convergent nature of the mixing chamber 24 further insures that the coal and air entering at the inlet end thereof are thoroughly mixed to provide a substantially uniform mixture of pulverulent material and air at the outlet end of the nozzle 22. Additionally, the convergent nature of the mixing chamber 24 causes the coal and air mixture to accelerate to an essentially uniform velocity at the oulet of the mixing chamber.

Figure 2:
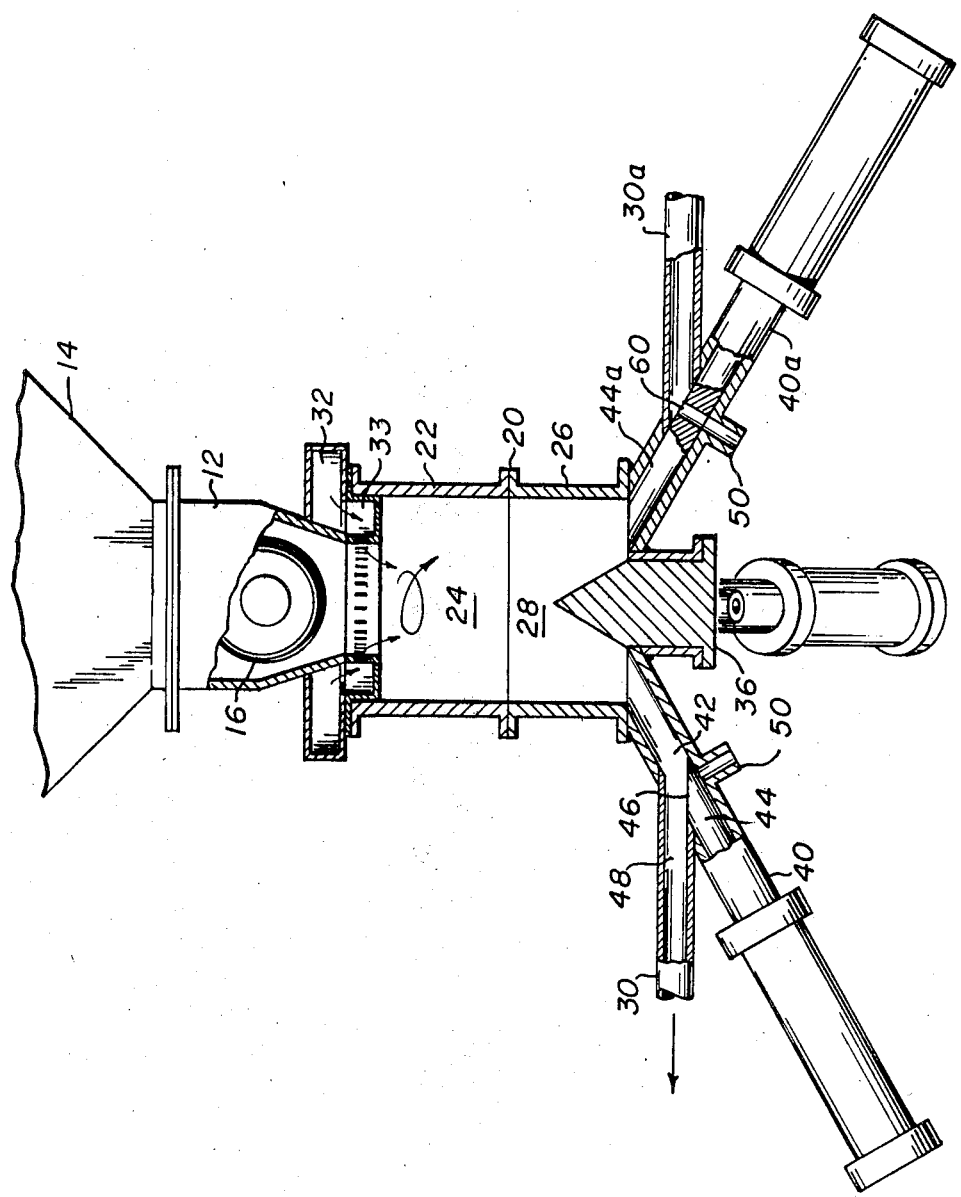
FIG. 2 is a sectional side elevational view showing a pulverulent material distribution system employing a vertically disposed flow splitter designed in accordance with the present invention.

The substantially uniform mixture of pulverulent material and air discharging from the inlet nozzle 22 passes into a substantially cylindrical distribution chamber 28 defined by the distributor housing 26. The distribution chamber 28 has an inlet end which mates to the outlet end of the mixing chamber 24 for receiving the mixture of pulverulent material and air discharging through the inlet nozzle 22 and a plurality of outlet openings 34 equally spaced about the periphery of and opening from the opposite end of the distribution chamber 28. The outlet openings 34 may be disposed in the sidewall of the cylindrical distribution chamber 28 as shown in FIG. 1, or the outlet openings 34 may be disposed in the floor of the outlet chamber 38 as shown in FIG. 2.

Preferably, a splitter plug 36 having a conical tip is coaxially disposed within the distribution chamber 28. The conical tip of the splitter plug 36 faces the inlet end of the distribution chamber with the base of the conical tip aligned adjacent the outlet openings 34 about the periphery of the distribution chamber 28. Tests have indicated that, although satisfactory distribution can be obtained without the plug 36, the splitter plug 36 when installed enhances performance of flow splitter and aids in uniformly distributing the pulverulent material and air mixture to the various outlet openings.

Associated with each outlet opening 34 is an outlet valve assembly 40 which defines a flow conduit 42. The flow conduit 42 has an inlet end mated to its associated outlet opening 34 in the distributor chamber 28 and an outlet opening to which a transport pipe 30 is attached for directing the pulverulent material and air mixture passing therethrough to the desired receiving station. A valve member 44 is slottably disposed within the flow conduit 42 of each valve assembly 40. Each valve member 44 is selectably positionable within the flow conduit 42 from the outlet opening 34 of the distributor housing 26 at the inlet end of the flow conduit to a point downstream of the outlet 48 of the flow conduit 42 to which the transport pipe 30 is connected.

With the end face 46 of the valve member 40 retracted to a position just down stream of the outlet 48 of the flow conduit 42, the pulverulent material and air mixture is free to flow from the distribution chamber 28 through the outlet opening 34 thereto, thence through the flow conduit 42 of the valve assembly 40 and into the transport pipe 30 to be directed to a particular receiving station.

In order to shut off flow through a particular transport pipe such as 30A, valve member 44A of valve assembly 40A associated with transport pipe 30A is positioned within the flow conduit through valve assembly 40A so that the end face of valve member 44A is flushed with the outlet opening from the distribution chamber 28. In accordance with the present invention, the end face 46 of each valve member 44 is contoured to conform with the inner surface of the cylindrical housing 26 defining the distribution chamber 28. Thus when the flow conduit 42 is closed off by positioning the valve member 44 at the outlet 34 in the distribution chamber 28, the end face 46 of the valve member 44 mates with the surface of the wall defining the chamber so as to present a smooth surface to the flow of pulverulent material within the distribution chamber 28. Because a smooth surface is presented to the flow of pulverulent material and air within the distribution chamber, turbulence is not generated by the presence of an opening in the wall of the distribution chamber 28 to a closed off flow conduit. Thus, the problems of flow conduit plugging and maldistribution within the chamber 28 due to the presence of turbulence as discussed earlier is avoided.

Additionally, purge means may be provided to clean the transport line 30A and the flow conduit 42 of any pulverulent material when either bringing the distribution system on line or taking it off line. The purge means comprise a nozzle 50 associated with the valve assembly and opening into the flow conduit 42 at a position opposite the outlet opening 48. A hole 60 extends transversely through the valve member 44 so as to communicate the purge nozzle 50 with the transport line 30a when the valve member 44 is in the fully extending position, i.e., when the end face 46 of the valve member is positioned at the outlet 34 in the distribution chamber such as illustrated by valve member 44a in the drawing. In this position, pressurized purge air may be directed from purge nozzle 50 through the hole 60 in valve member 44*a* into transport line 30*a* to clear the line of any pulverulent material which may have deposited therein when the system was shut down.

While only one embodiment of the flow splitter of the present invention has been shown, it will be appreciated that modifications thereof, some of which have been eluded to herein, may be readily made thereto by those skilled in the art. For instance, although the flow splitter shown in the figure is designed to split a single stream of pulverulent material and air into four equal streams, it is to be understood that any number, odd or even, of outlet openings may be made in the distribution chamber 28. It is well within the present invention to modify the flow splitter to have two, three, six, eight, or even more outlet openings so as to provide any desired split of a single flow stream entering thereto. Therefore, it is intended by the appended claims to cover the modifications alluded to herein as well as all other modifications which fall within the true spirit and scope of the invention.

We claim:

1. A flow splitter for dividing a stream of pulverulent material into a multiplicity of substantially equal substreams, the flow splitter comprising:

a. an inlet nozzle defining an open-ended mixing chamber for receiving a stream of pulverulent material and a stream of air for intermixing therein;

b. a distributor housing defining a substantially cylindrical distribution chamber having an inlet for receiving the mixture of pulverulent material and air from the inlet nozzle and a plurality of outlet openings equally spaced about the periphery of and opening from the opposite end thereof;

c. a plurality of outlet valve assemblies equal in number to the number of outlet openings in the distribution chamber, each outlet valve assembly defining a flow conduit having an inlet mated to an outlet opening in the distribution chamber and an outlet opening;

d. a plurality of valve members, one per valve assembly, each valve member slidably disposed within the flow conduit of a valve assembly and retractably movable therein from the inlet thereof when extended to a point downstream of the outlet thereof when retracted, the end face of each valve member contoured to conform with the inner surface of the cylindrical distribution chamber to which the valve assembly mates when the valve member is in its extended position;

e. purge means opening into the flow conduit of each valve assembly at a location opposite the outlet opening of the flow conduit; and f. a hole extending traversely through each valve member so as to communicate the purge means with the outlet opening of the flow conduit when the valve member is in its extended position.

2. A flow splitter as recited in claim 1 further comprising a splitter plug having a conical tip coaxially disposed within the distribution chamber, the conical tip of the splitter plug facing the inlet end of the distribution chamber with the base of the conical tip lying adjacent the outlet openings spaced about the periphery of the distribution chamber.

3. A flow splitter as recited in claim 1 or 2 further comprising means disposed at the inlet of the inlet nozzle for swirling the air entering thereto so as to establish a vortex within the mixing chamber whereby the intermixing of pulverulent material and air is enhanced.

4. A flow splitter as recited in claim 1 or 2 wherein the inlet nozzle defines an elongated open-ended convergent mixing chamber for receiving the stream of pulverulent material and a stream of air for intermixing therein.

5. A flow splitter as recited in claim 3 wherein the inlet nozzle defines an elongated open-ended convergent mixing chamber for receiving the stream of pulverulent material and a stream of air for intermixing therein.

6. A flow splitter as recited in claim 4 wherein the plurality of outlet openings of the distribution chamber are arranged in the wall thereof equally spaced about the periphery of the end opposite the inlet thereof.

7. A flow splitter as recited in claim 6 wherein the inlet nozzle defines an elongated open-ended convergent mixing chamber for receiving the stream of pulverulent material and a stream of air for intermixing therein.

* * * * *